Feb. 2, 1960
D. S. TURBYFILL
2,923,017
NON-BINDING CASTER
Filed Sept. 20, 1957
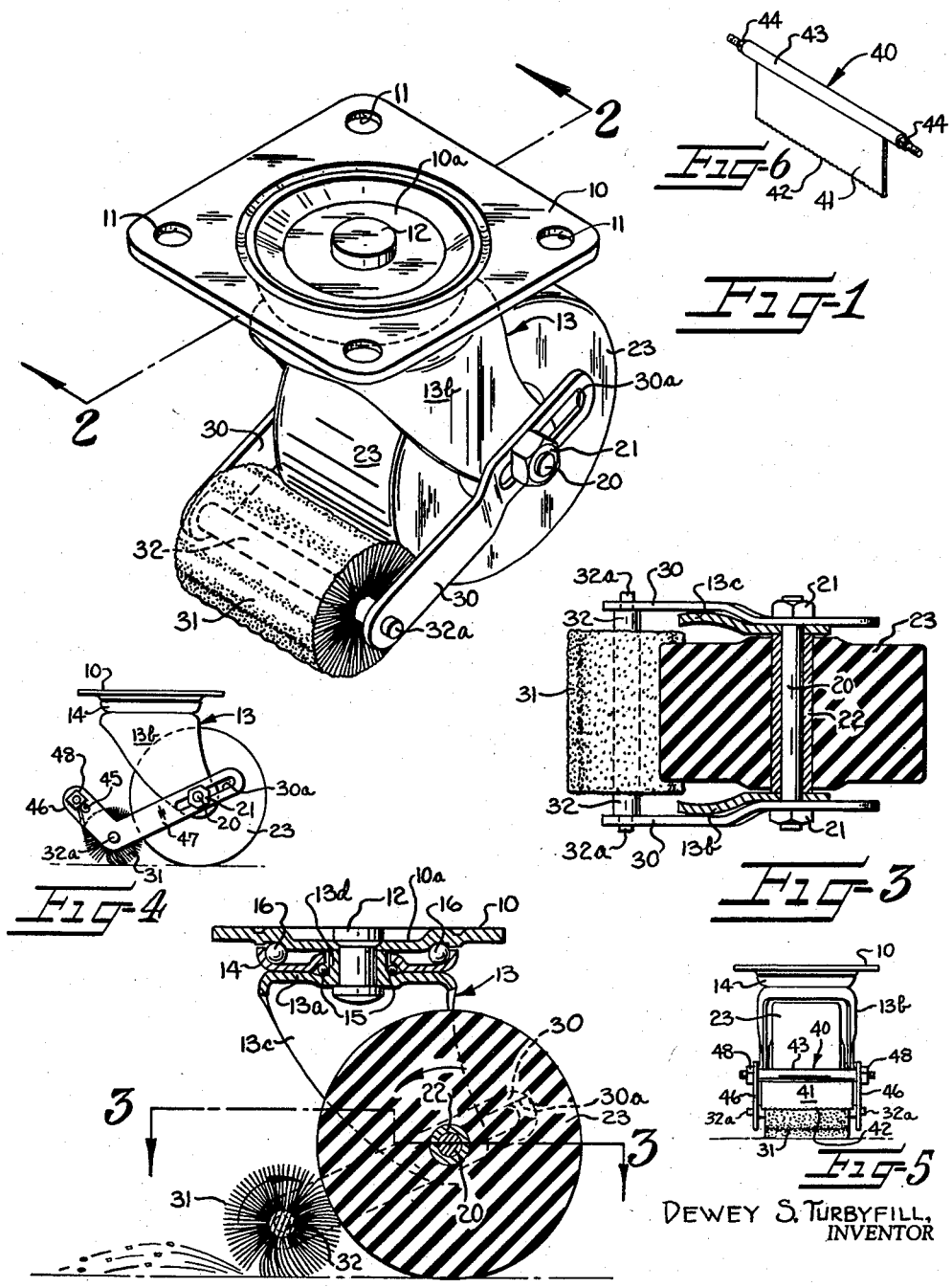
Dewey S. Turbyfill,
INVENTOR
BY Eaton, Bell, Hunt & Seltzer
ATTORNEYS

United States Patent Office 2,923,017
Patented Feb. 2, 1960

2,923,017

NON-BINDING CASTER

Dewey S. Turbyfill, Hickory, N.C.

Application September 20, 1957, Serial No. 685,241

4 Claims. (Cl. 15—49)

This invention relates to non-binding casters and more particularly to a caster having a rotatable sweeper associated therewith for sweeping the floor in advance of the caster.

It is well known that conventional casters when used in textile mills and in other places where fibers and yarns are found on the floor, that the fibers and yarns tend to be wrapped around the axles of the casters as they are rolled along the floor. For example, push carts and other conveyances which are used in textile mills and supported on casters have been frequently rendered inoperative as a result of binding or locking of free fibers or yarns around the axles during the rotation of the caster wheels.

Many other industries, such as barber shops or the like where hairs are on the floor have encountered similar problems and have attempted without success to provide a caster that does not bind when exposed to fibers, yarns or hair on the floor. Various shields or guards have been designed for application to casters, to prevent the fibers or yarns from being wrapped around the axles, but these shields or guards have been relatively expensive and have proved to be either too cumbersome or not totally effective for the intended purpose.

Other attempts to provide a non-binding caster have approached the problem in a completely different manner and have provided stationary circular brushes to surround the casters to always sweep the floor in advance of the caster rolling thereon. This approach, although being effective for its intended purpose is too expensive and has made it extremely difficult to lubricate the casters at spaced intervals since the caster is usually completely shrouded or shielded by the circular brush.

It is accordingly the primary object of this invention to provide an efficient and inexpensive non-binding caster by mounting a cylindrical floor sweeper such as a brush on the caster to be rotated by the caster wheel to sweep the floor in advance of the wheel to eliminate any threads, yarn or the like wrapping around the axle of the caster and binding the same.

Another object of the invention is to provide a caster wheel driven brush for sweeping the floor in advance of the caster wheel and which is so mounted that it does not interfere with the lubrication of the caster and which brush can readily be replaced when worn.

A further object of the invention is to provide a brush in association with a caster for sweeping the floor in advance of the rotating caster wheel and wherein means are provided for adjusting the position of the brush as the brush becomes worn so as to obtain a greater life out of each brush before replacing the same.

It is also an object of the invention to provide means in the form of a wiper plate to prevent the foreign material engaged by the brush from accumulating thereon and rendering the brush ineffective.

Some of the objects of the invention having been stated, other objects will appear as the description proceeds when taken in connection with the accompanying drawings in which—

Figure 1 is a perspective view of a conventional caster with the invention applied thereto;

Figure 2 is a vertical sectional view taken along line 2—2 of Figure 1 and showing the driving relation of the caster wheel with the brush;

Figure 3 is a horizontal sectional view partly in plan taken along line 3—3 of Figure 2;

Figure 4 is a side elevation on a reduced scale of a modified form of the invention showing a wiper plate associated with the brush for maintaining the brush substantially free of foreign materials;

Figure 5 is an end elevation looking from the left side of Figure 4; and

Figure 6 is a perspective view on an enlarged scale of the wiper plate.

Referring now to the drawings, particularly Figures 1 to 3, a conventional caster is shown to which the invention has been applied which caster has a mounting plate 10 having a plurality of holes or apertures 11 for permitting the caster to be secured to any suitable cart or other conveyance. The mounting plate 10 is provided with a circularly arranged recessed portion 10a through the medial portion of which extends a stud shaft 12 for supporting a yoke member 13 by extending through a medial portion 13a thereof. The yoke member 13 is provided with identical depending leg portions 13b and 13c and a collar or hub portion 13d extending upwardly from the medial portion 13a thereof and serving as a guide for a plurality of inner roller bearings 15. A cup-shaped disk-like member 14 is positioned between the mounting plate 10 and the medial portion 13a of the yoke 13 to aid in retaining the inner roller bearings 15 in proper position and also to aid in properly positioning outer roller bearings 16.

It should be noted that the leg portions 13b and 13c of the yoke 13 are downwardly and rearwardly curved as viewed in Figure 1 and have their lower ends terminating rearwardly out of vertical alinement with the stub shaft 12 to assure that the yoke 13 will pivot in accordance with the direction of movement of the cart or conveyance to which the caster is attached to normally rotate the caster wheel 23 in a given direction at all times. This is characteristic of most all types of conventional casters.

The caster wheel 23 is provided with a sleeve-like bearing 22 which is penetrated by an axle 20 which is secured to the lower end of the vertical arms 13b, 13c of the yoke 13 by locking nuts 21. A pair of flexible arms 30 formed of thin sheet metal are also secured to the axle 20 by the locking nuts 21 and extend forwardly and downwardly therefrom as viewed in Figure 2 and rotatively carry means for sweeping the floor shown in the form of a brush 31 mounted on a suitable shaft 32. It should be noted that opposite ends of the shaft 32 are reduced as indicated at 32a to define inner shoulder portions which serve as stops for the arm members 30 to rotatively carry the brush 31. The rear or upper ends of the arms 30 are each provided with a slot 30a to permit the arms 30 to be adjusted relative to the caster wheel axle 20 to position the brush 31 in driving engagement with the periphery of the caster wheel 23.

As shown in Figure 2, the caster wheel 23 will normally rotate counterclockwise in the direction of the arrow therein, irrespective of the direction of movement of the cart or conveyance to which the caster is attached. The brush 31 is preferably formed of relatively stiff resilient bristles to insure a good driving relation with the caster wheel 23. The brush 31 is driven at all times in an opposite direction from the caster wheel 23 and slightly touches the floor to sweep the floor in advance of the caster wheel rolling thereon. The brush 31 is preferably of a greater length than the width of the caster wheel 23 to extend beyond both sides thereof to greater insure that threads, lint or the like will not wrap around the axle 20 of the caster wheel.

The provision of the elongated slots 30a in the upper end of the arms 30 permit the brush 31 to be adjusted as it wears to always permit the brush to be positioned in driving engagement with the caster wheel 23. This of course insures that the maximum amount of wear may be obtained from each brush 31 prior to the same being replaced. To replace a brush, it is merely necessary to spring outwardly one of the arms 30 to disengage the shaft of the brush 31 therefrom. This particular arrangement permits an old brush to be replaced by a new one and adjusted in proper driving relation to the caster wheel 23 in a minimum amount of time.

Referring now to Figures 4 to 6 wherein a modified form of the invention is illustrated, the same reference numerals as previously used are applied to indicate identical elements therein. This form of the invention basically differs over the first form by providing means shown in the form of a wiper plate 40 for maintaining the periphery of the brush 31 substantially free of accumulation of foreign material such as yarns, thread or the like at all times. This form of the invention would be most desirable where the surface of the floor has such an accumulation of foreign material that the brush could not maintain itself clean during its normal sweeping action.

The wiper plate 40 comprises a rigid plate-like blade 41 having a serrated lower edge 42 which is mounted to engage the bristles of the brush as it rotates and wipe the surface of the brush free of foreign materials. The blade 41 is suitably secured to a shaft 43 which has threaded opposite ends preferably provided with squared inner portions 44 serving as shoulders for preventing rotation of the shaft when it is mounted in slots 45 of upwardly directed arms 46 formed integral with arms 47 which are similar to arms 30. Suitable nuts 48 are provided for maintaining the shaft 43 of the wiper plate in the desired adjusted position in the slots 45 for proper operation of the blade 41.

It should be noted in Figure 4 that the wiper blade 41 preferably is positioned to engage the forwardmost portion of the brush 31 to permit the material removed from the brush to drop free thereof onto the surface of the floor. The blade 41 is preferably of a length slightly longer than the brush 31 to facilitate the removing of threads or the like that might be extending beyond the sides of the brush. The blade 41 is also preferably formed of a plastic material such as polystyrene rather than metal to minimize the wear on the brush bristles.

It is thus seen that there has been disclosed means in the form of a brush in association with a caster for sweeping the floor in advance of the movement of the caster wheel thereon and which brush is so positioned relative to the caster that it does not interfere with the lubrication of the caster bearings and presents a caster which will not be rendered inoperative as a result of binding or locking normally caused by the wrapping of fibers or yarn around the axle thereof.

Although a bristle brush has been illustrated and described for sweeping the floor in advance of the caster wheel, applicant's invention is not to be so restricted but is to be afforded the scope of any suitable equivalents such as sponge rollers, cloth rollers, etc. which will in some instances perform the desired result to an appreciable degree.

In the drawings and specification there has been set forth several embodiments of the invention and although specific terms are employed, they are used in a generic and descriptive sense only and not for purposes of limitation, the scope of the invention being defined in the claims.

I claim:

1. A non-binding caster comprising a pivotally mounted yoke having spaced apart vertical portions with their lower ends terminating rearwardly out of vertical alinement with the pivotal axis of the yoke, a rotatable caster wheel carried by said vertical portions, a pair of spaced arms also carried by said yoke and extending downwardly and forwardly in an opposite direction from the lower ends of said yoke, and an elongated rotatable floor sweeping means positioned in frictional driving relation to said caster wheel and carried by the outer ends of said arms for sweeping the floor in advance of movement of the caster wheel thereon.

2. A non-binding caster according to claim 1 wherein said elongated floor sweeping means is a rotatably mounted bristle brush and wherein the bristles of said brush are in frictional engagement with said caster wheel to cause the brush be driven thereby in an opposite direction during the sweeping of the floor in advance of the caster wheel.

3. A non-binding caster comprising a pivotally mounted yoke, an axle extending through said yoke, a rotatable caster wheel carried on said axle within said yoke, a pair of arms also carried by said axle and extending downwardly therefrom in spaced relation relative to each other, a rotatable brush positioned in the outer ends of said arms, said brush being positioned in frictional engagement with said caster wheel and in contact with the floor whereby the floor is swept in advance of the caster wheel rolling thereon, a pair of arms extending upwardly from said downwardly extending pair of arms, and means carried by said upwardly extending arms for cleaning said brush.

4. A non-binding caster according to claim 3 wherein means are provided for adjusting the position of said arms on said caster wheel axle whereby the brush as it becomes worn may be adjusted relative to the caster wheel to maintain the brush in driving relation therewith.

References Cited in the file of this patent

UNITED STATES PATENTS

| | | |
|---|---|---|
| 214,990 | Buck | May 6, 1879 |
| 716,952 | Fredericks | June 7, 1904 |
| 2,046,384 | Katcher | July 7, 1936 |
| 2,793,378 | Williams | May 28, 1957 |

FOREIGN PATENTS

| | | |
|---|---|---|
| 1,126,575 | France | July 30, 1956 |